(12) United States Patent
Saito

(10) Patent No.: US 11,077,532 B2
(45) Date of Patent: Aug. 3, 2021

(54) CONTACT SPRING HOLDING JIG FOR GREASE APPLICATION

(71) Applicant: YAZAKI CORPORATION, Tokyo (JP)

(72) Inventor: Akihiro Saito, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 191 days.

(21) Appl. No.: 15/981,734

(22) Filed: May 16, 2018

(65) Prior Publication Data

US 2018/0333815 A1 Nov. 22, 2018

(30) Foreign Application Priority Data

May 17, 2017 (JP) .............................. JP2017-098408

(51) Int. Cl.
  *B23Q 3/18* (2006.01)
  *H01R 43/00* (2006.01)
  *H01R 13/11* (2006.01)
  *H01R 13/187* (2006.01)

(52) U.S. Cl.
  CPC .............. *B23Q 3/18* (2013.01); *H01R 43/00* (2013.01); *H01R 43/002* (2013.01); *H01R 13/11* (2013.01); *H01R 13/187* (2013.01)

(58) Field of Classification Search
  CPC .. B25B 5/00; B25B 5/16; B25B 5/163; B23Q 3/14; B23P 19/00; B23P 19/04; B23P 11/00; B23P 11/005; B23P 11/02; H01R 43/002; H01R 43/00; H01R 43/18; H01R 43/20; H01R 13/11; H01R 13/187

USPC ..... 269/287; 29/33 R, 33.2, 33 M, 739, 225, 29/281.1, 281.5; 439/843
See application file for complete search history.

(56) References Cited

U.S. PATENT DOCUMENTS

| | | | | |
|---|---|---|---|---|
| 9,293,852 B2* | 3/2016 | Glick | ...................... | H01R 43/20 |
| 10,119,940 B2* | 11/2018 | Tat | ......................... | G01N 29/04 |
| 2010/0267292 A1* | 10/2010 | Pueschner | ............ | H01R 4/4818 |
| | | | | 439/834 |
| 2016/0087351 A1* | 3/2016 | Ohkubo | ................ | H01R 4/183 |
| | | | | 439/877 |

FOREIGN PATENT DOCUMENTS

| | | | | |
|---|---|---|---|---|
| JP | 2013-187170 A | | 9/2013 | |
| JP | 2013187168 | * | 9/2013 | ........... H01R 13/187 |
| WO | WO-2015053295 A1 | * | 4/2015 | ........... H01R 13/187 |

OTHER PUBLICATIONS

Machine translation of WO2015/053295, Apr. 16, 2015 (Year: 2015).*

* cited by examiner

*Primary Examiner* — Orlando E Aviles
*Assistant Examiner* — Robert F Neibaur
(74) *Attorney, Agent, or Firm* — Kenealy Vaidya LLP

(57) ABSTRACT

A contact spring holding jig for grease application includes a spring placement portion on which a connector terminal contact spring is to be placed, and a spring position restricting wall. The connector terminal contact spring includes a plurality of spring pieces and a connecting portion positioning at an end portion of the connector terminal contact spring. The plurality of spring pieces include a gap with adjacent spring pieces are connected to be arranged side by side by the connecting portion. The connector terminal contact spring is placed with the connecting portion facing downward, on the spring placement portion.

4 Claims, 8 Drawing Sheets

CONTACT SPRING HOLDING JIG FOR GREASE APPLICATION

CROSS REFERENCE TO RELATED APPLICATIONS

This application claims priority from Japanese Patent Application No. 2017-098408 filed on May 17, 2017, the entire contents of which are incorporated herein by reference.

BACKGROUND OF THE INVENTION

Field of the Invention

The present invention relates to a contact spring holding jig for grease application which holds a contact spring for a connector terminal to apply grease.

Description of Related Art

In a related art, in a connector terminal contact spring (see, for example, the patent document 1: JP-A-2013-187170) in which a plurality of spring pieces are connected to be arranged side by side while forming a gap between adjacent spring pieces by a connecting portion forming an end portion, grease is applied to the front and back sides of each spring piece serving as a contact point and its peripheral portion to prevent an increase in electric resistance.

[Patent Document 1] JP-A-2013-187170

According to a related art, when applying a grease by a spray using a jig in a state of holding a connector terminal contact spring, in order to hold the connector terminal contact spring, if parts other than a spring piece and its surrounding target region of grease application are fixed to the jig, the attachment work of the connector terminal contact spring to the jig or the removal work of the connector terminal contact spring from the jig becomes complicated. Further, the structure of the jig is complicated in order to hold the connector terminal contact spring by the jig so as not to interfere with the target region of grease application.

SUMMARY

One or more embodiments provide a contact spring holding jig for grease application in which a contact spring can be easily attached to and detached from the jig and which can hold a connector terminal contact spring with a simple structure so as not to interfere with a spring piece and its surrounding target region of grease application.

In an aspect (1), one or more embodiments provide a contact spring holding jig for grease application including a spring placement portion on which a connector terminal contact spring is to be placed, and a spring position restricting wall. The connector terminal contact spring includes a plurality of spring pieces and a connecting portion positioning at an end portion of the connector terminal contact spring. The plurality of spring pieces include a gap with adjacent spring pieces are connected to be arranged side by side by the connecting portion. The connector terminal contact spring is placed with the connecting portion facing downward, on the spring placement portion. The spring position restricting wall is erected on the spring placement portion and disposed in the gap with the adjacent spring pieces or in a gap which the connecting portion includes so as to restrict the position of the connector terminal contact spring on the spring placement portion, when the connector terminal contact spring is placed on the spring placement portion.

In an aspect (2), the spring position restricting wall is erected on the spring placement portion and disposed along an inner side and an outer side of the connecting portion, and includes an inner wall part and an outer wall part restricting a position of the connector terminal contact spring on the spring placement portion. The inner wall part and the outer wall part are arranged on the spring placement portion so as to sandwich the connecting portion therebetween.

According to the aspect (1), when the connector terminal contact spring is placed on the spring placement portion, the spring position restricting wall is disposed in the gap between the adjacent spring pieces or the gap of the connecting portion to restrict the position on the spring placement portion without fixing the connector terminal contact spring, and furthermore, the spring position restricting wall has a simple structure of a wall erected on the spring placement portion, the contact spring is easily attached to and detached from the jig, and the connector terminal contact spring can be held with a simple structure so as not to interfere with the spring piece and its surrounding target region of grease application in the vicinity thereof.

According to the aspect (2), since the spring position restricting wall restricts the position on the spring placement portion of the connector terminal contact spring in the width direction of the spring piece by the inner side wall and the outer side wall, it is possible to further improve the holding performance of the connector terminal contact spring on the placement portion.

DETAILED DESCRIPTION

Exemplary embodiments of a contact spring holding jig are described in detail below with reference to the drawings.

Figure 1:
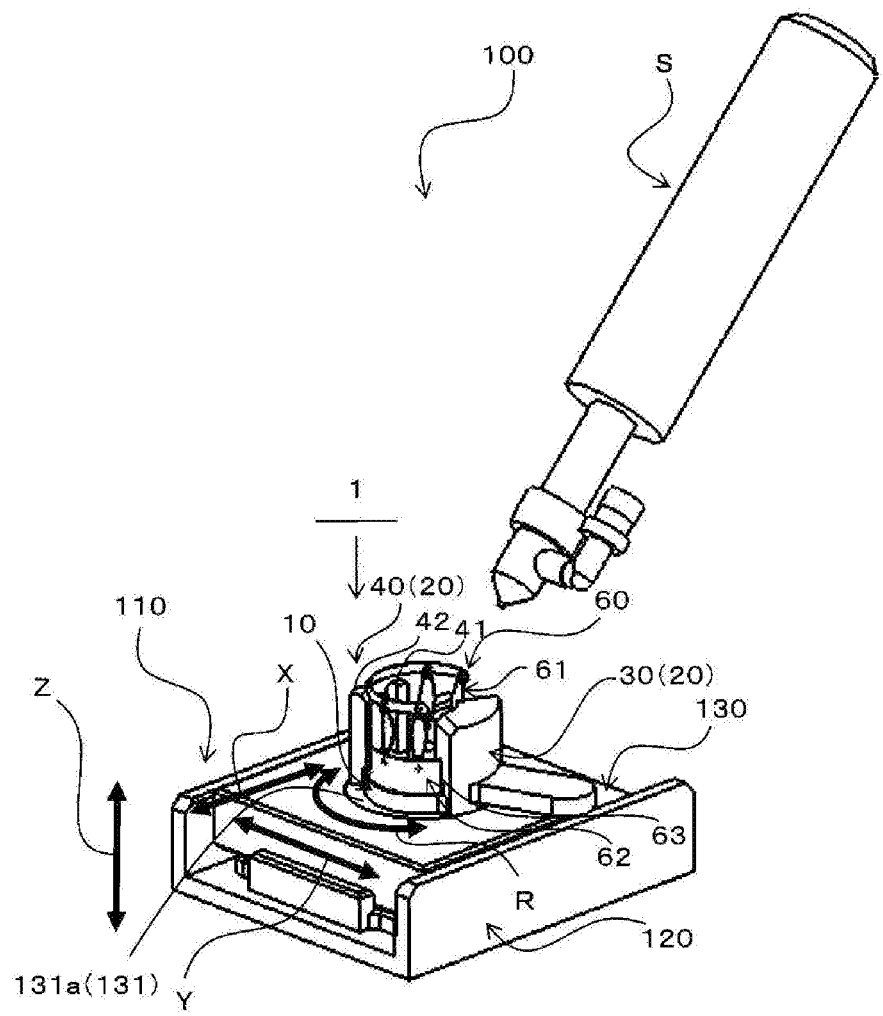
FIG. 1 is a perspective view illustrating a movable table and a grease applying spray in which a contact spring holding jig for grease application according to an embodiment of the present invention is incorporated.
Figure 2A:
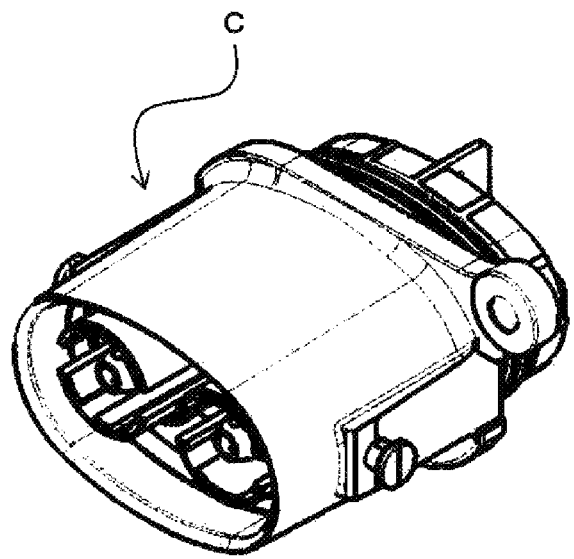
FIG. 2A is a perspective view illustrating a connector in which a connector terminal contact spring is incorporated.
Figure 2B:
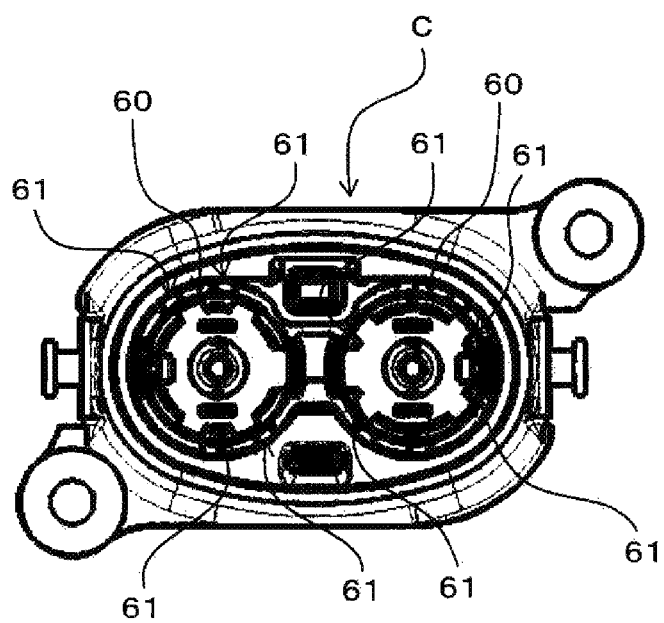
FIG. 2B is a front view of the connector illustrated in FIG. 2A.
Figure 3:
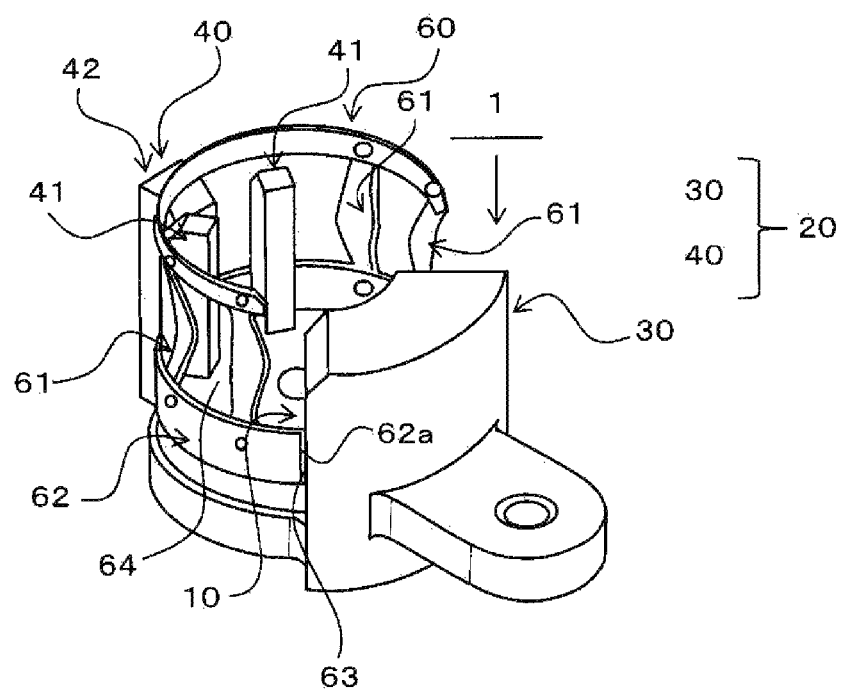
FIG. 3 is a perspective view illustrating a state where the connector terminal contact spring is set in the contact spring holding jig for grease application.
Figure 4A:
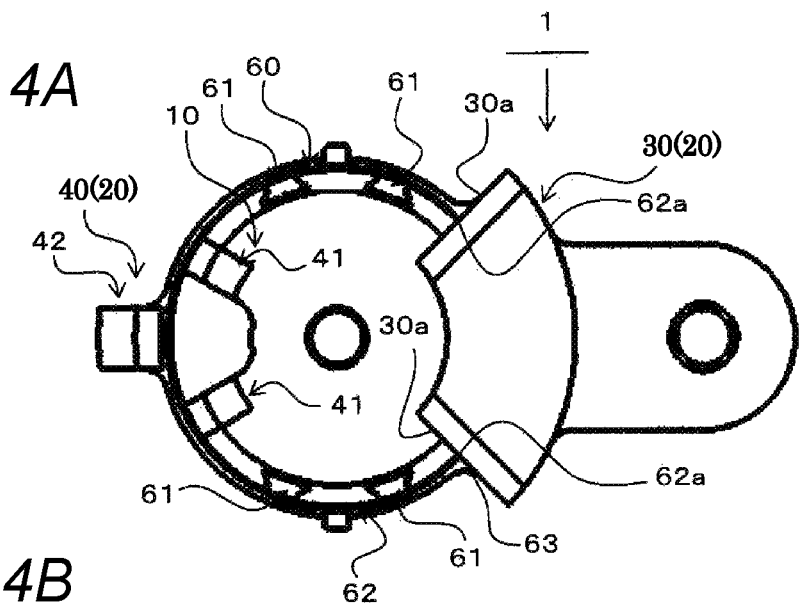
FIG. 4A is a view illustrating the state where the connector terminal contact spring is set in the contact spring holding jig for grease application as viewed from an upper surface side.
Figure 4B:
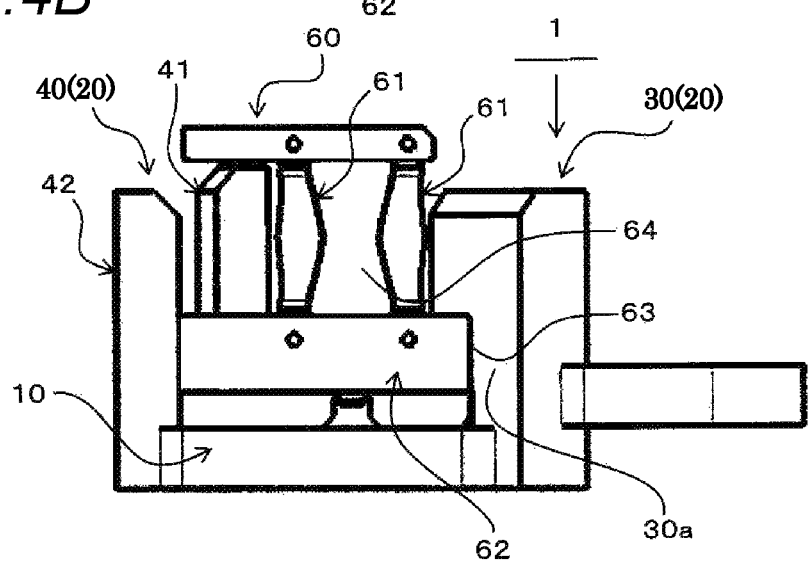
FIG. 4B is a view illustrating the state as viewed from a side surface side.
Figure 5A:
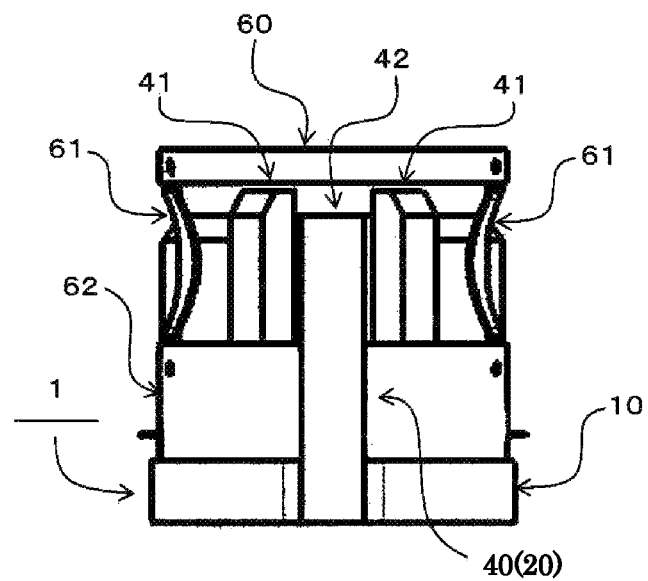
FIG. 5A is a view illustrating the contact spring holding jig for grease application as viewed from a second spring position restricting wall side.
Figure 5B:
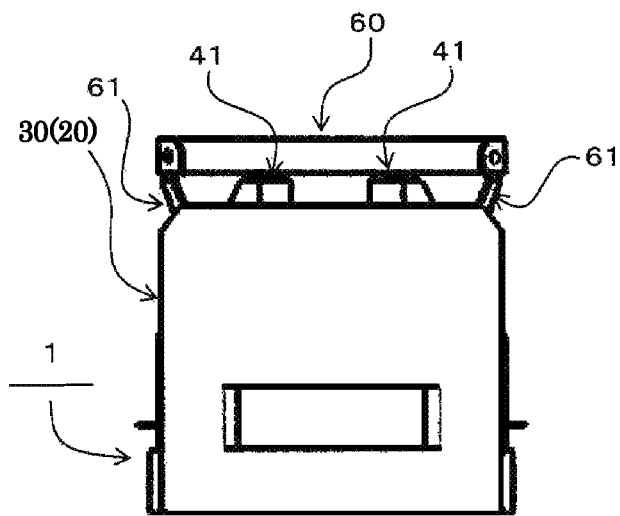
FIG. 5B is a view illustrating the contact spring holding jig for grease application as viewed from a first spring position restricting wall side.
Figure 6A:
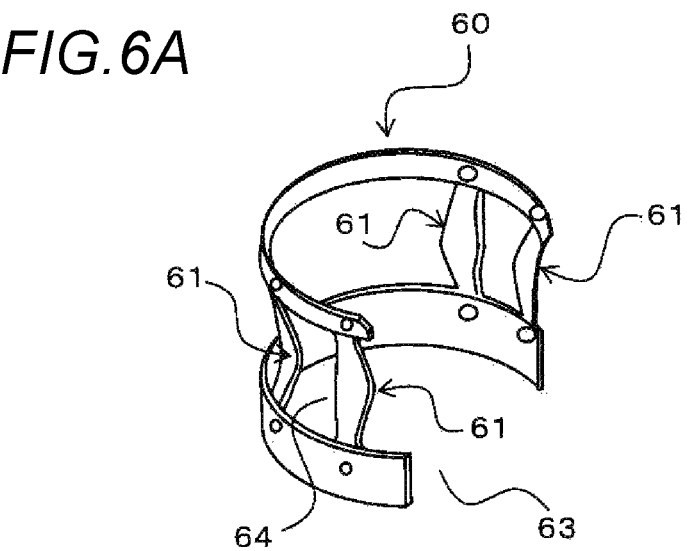
FIG. 6A is a perspective view illustrating the connector terminal contact spring.
Figure 6B:
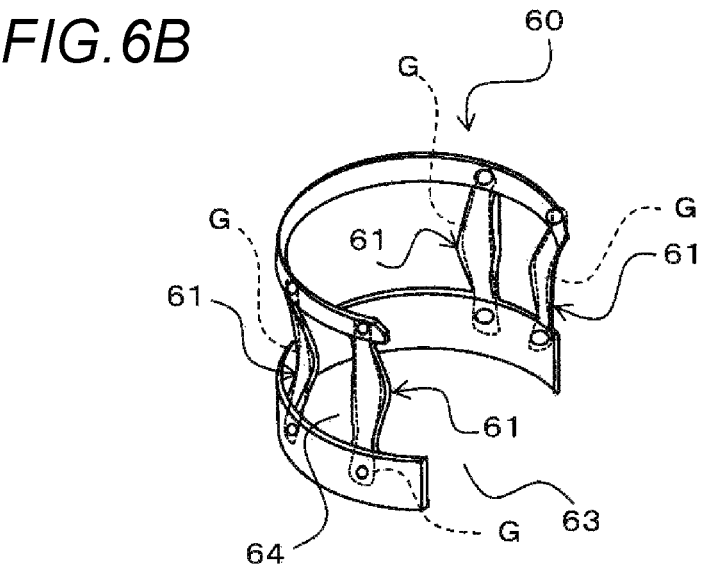
FIG. 6B is a view illustrating a state where grease is applied to the connector terminal contact spring illustrated in FIG. 6A.

FIG. 1 is a perspective view illustrating a movable table 110 and a spray S for grease application in which a contact spring holding jig 1 for grease application according to an embodiment of the invention is incorporated. FIG. 2A is a perspective view illustrating a connector C in which a connector terminal contact spring 60 is incorporated, and FIG. 2B is a front view of the connector C illustrated in FIG. 2A. FIG. 3 is a perspective view illustrating a state where the connector terminal contact spring 60 is set in the contact spring holding jig 1 for grease application. FIG. 4A is a view illustrating the state where the connector terminal contact spring 60 is set in the contact spring holding jig 1 for grease application as viewed from an upper surface side, and FIG. 4B is a view illustrating the state as seen from a side surface side. FIG. 5A is a view illustrating the contact spring holding jig 1 for grease application as viewed from a second spring position restricting wall 40 side, and FIG. 5B is a view illustrating the contact spring holding jig 1 for grease application as viewed from a first spring position restricting wall 30 side. FIG. 6A is a perspective view of the connector terminal contact spring 60, and FIG. 6B is a view illustrating a state where grease G is applied to the connector terminal contact spring 60 illustrated in FIG. 6A.

The contact spring holding jig 1 for grease application according to the embodiment of the invention is incorporated in a grease application apparatus 100. More specifically, the contact spring holding jig 1 for grease application is incorporated in a movable table 110 which changes the relative position of the connector terminal contact spring 60 held by the contact spring holding jig 1 for grease application with respect to the grease applying spray S.

Hereinafter, the grease application apparatus 100 incorporating the contact spring holding jig 1 for grease application will be described.

The grease application apparatus 100 automatically applies the grease G to the spring piece 61 of the connector terminal contact spring 60 and the target region of grease application around the spring piece 61 by the grease applying spray S.

As illustrated in FIGS. 6A and 6B, the connector terminal contact spring 60 to which the grease G is applied in the embodiment is arranged side by side, while a gap 63 is formed by a connecting portion 62 in which four spring pieces 61 form the end portions.

Although an example in which the connector terminal contact spring 60 has four spring pieces 61 has been described, the number of the spring pieces 61 is not limited thereto and the number thereof may be plural.

The connector terminal contact spring 60 has a connecting portion 62 formed in a circular arc shape, and a gap 63 is formed between both end surfaces 62a of the connecting portion 62.

As illustrated in FIGS. 2A and 2B, the connector terminal contact spring 60 has a function of increasing the contact area with a mating terminal (not illustrated) by being incorporated as a terminal of the connector C.

In addition, as illustrated in FIG. 2B, in order to prevent an increase in the electrical resistance of the connector terminal contact spring 60, the grease G is applied to the front and back surfaces of each spring piece and the periphery thereof by the grease application apparatus 100.

As illustrated in FIG. 1, the grease application apparatus 100 includes a grease applying spray S fixed at a predetermined position, a movable table 110 for changing the relative position of the connector terminal contact spring 60 with respect to the grease applying spray S, and a driving unit (not illustrated) that drives the movable table 110 based on a control signal from a control unit (not illustrated).

The grease applying spray S is generally used and applies grease that prevents an increase in electric resistance, such as urea grease, by spraying.

The movable table 110 has a guide frame portion 120, a movable base portion 130, and a contact spring holding jig 1 for grease application.

The guide frame portion 120 is a part that guides the movable base portion 130 so that it can slide and move in the direction of an arrow XY in FIG. 1.

The guide frame portion 120 can be moved in a direction of arrow Z in FIG. 1 by a driving unit (not illustrated).

The movable base portion 130 is formed to be movable in the X and Y directions by being guided by the guide frame portion 120.

The movable base portion 130 is provided with a jig disposing portion 131 incorporated in the contact spring holding jig 1 for grease application so as to be rotatable in the arrow R direction in FIG. 1.

The jig disposing portion 131 has a guide groove portion 131a recessed in a circular shape so that the bottom portion of the contact spring holding jig 1 for grease application is fitted thereto.

The contact spring holding jig 1 for grease application is adapted to be rotatable in a direction of the arrow R on the movable base portion 130 by being fitted into the guide groove portion 131a.

The contact spring holding jig 1 for grease application includes a spring placement portion 10 on which the connector terminal contact spring 60 is placed with the connecting portion 62 facing downward, and a spring position restricting wall 20 which restricts the position of the connector terminal contact spring 60 on the spring placement portion 10.

The spring placement portion 10 is a part which is provided with a surface on which the contact spring holding jig 1 for grease application is placed.

The spring placement portion 10 is formed in an arc shape with an outer shell corresponding to the connector terminal contact spring 60.

The spring position restricting wall 20 includes a first spring position restricting wall 30 disposed in the gap 63 of the connecting portion 62, and a second spring position restricting wall 40 which sandwiches the connecting portion 62 therebetween, by a pair of inner wall parts 41 provided inside the connecting portion 62 and outer wall parts 42 provided outside the connecting portion 62.

As illustrated in FIG. 4A, the first spring position restricting wall 30 is erected on the spring placement portion 10, and a pair of spring position restricting surfaces 30a and 30a disposed close to both end surfaces 62a and 62a of the connecting portion 62 forming a gap of the connecting portion 62.

The first spring position restricting wall 30 is disposed in the gap 63 of the connecting portion 62 on which the spring piece 61 is not disposed.

The first spring position restricting wall 30 prevents the connector terminal contact spring 60 from being moved in the direction in which the four spring pieces 61 are arranged so as not to interfere with the spring piece 61 and the target region of grease application around the spring piece 61.

The first spring position restricting wall 30 is erected substantially vertically to the surface on which the connector terminal contact spring 60 of the spring placement portion 10 is placed.

Therefore, when setting the connector terminal contact spring 60 on the spring placement portion 10, if the connector terminal contact spring 60 is moved from above the spring placement portion 10 to the spring placement portion 10, the first spring position restricting wall 30 is disposed in the gap 63 of the connecting portion 62.

The second spring position restricting wall 40 is formed so that the connecting portion 62 is sandwiched between the pair of inner side walls 41 and 41 disposed in the region of the connecting portion 62 in which the spring pieces 61 are arranged at a large interval and the outer side wall 42.

More specifically, the second spring position restricting wall 40 is arranged such that the pair of inner wall parts 41 and 41 are disposed at intervals along the inner side of the connecting portion 62 placed on the spring placement portion 10, and the outer wall part 42 is disposed substantially at the center position of the pair of inner side walls 41 and 41.

The pair of inner wall parts 41 and 41 and the outer wall part 42 forming the second spring position restricting wall 40 are erected substantially vertically to the surface on which the connector terminal contact spring 60 of the spring placement portion 10 is placed.

Therefore, when setting the connector terminal contact spring 60 on the spring placement portion 10, if the connector terminal contact spring 60 is moved from above the spring placement portion 10 to the spring placement portion 10, the second spring position restricting wall 40 is disposed to sandwich the connecting portion 62.

The second spring position restricting wall 40 as described above prevents the connector terminal contact spring 60 from moving in the width direction of the spring piece 61 so as not to interfere with the spring piece 61 and its surrounding target region of grease application.

Next, a procedure for attaching the connector terminal contact spring 60 to the contact spring holding jig 1 for grease application will be described with reference to FIGS. 7A and 7B.

Figure 7A:
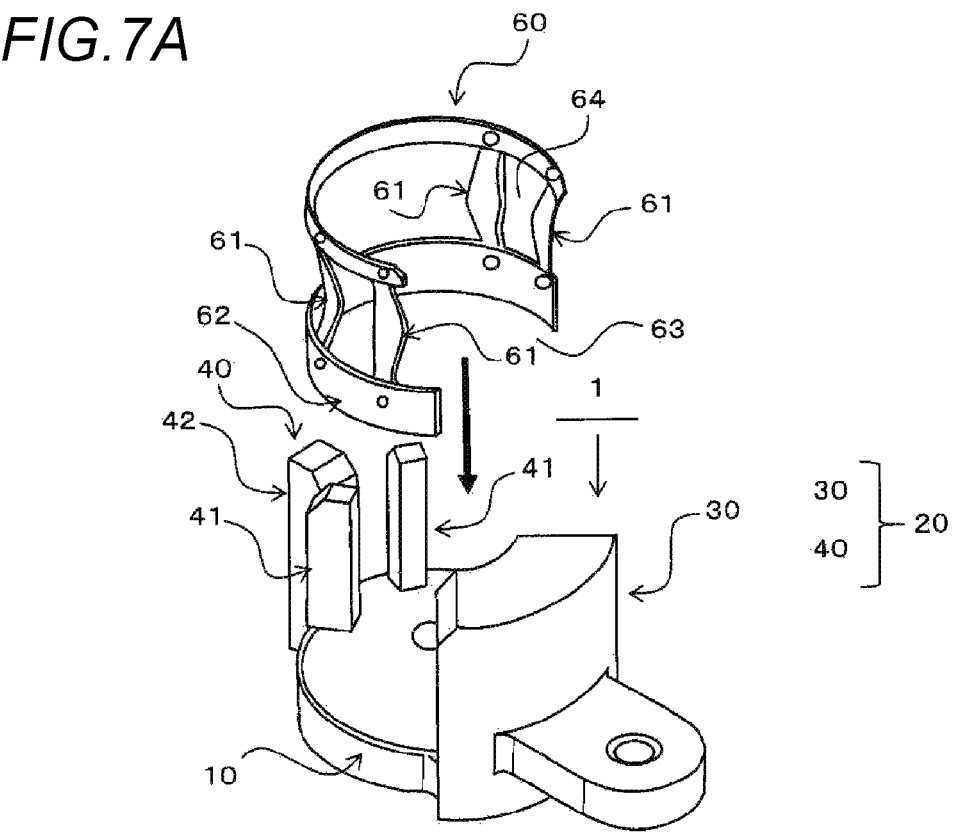
FIGS. 7A and 7B are views illustrating a procedure for attaching the connector terminal contact spring to the contact spring holding jig for grease application.
Figure 7B:
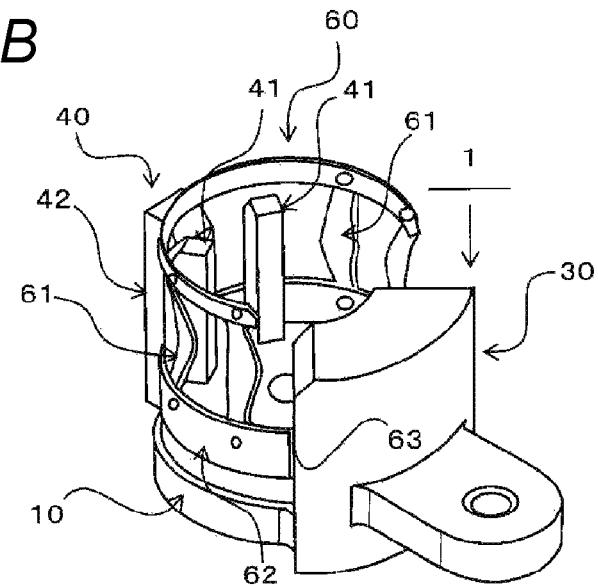

FIGS. 7A and 7B are views illustrating a procedure for attaching the connector terminal contact spring 60 to the contact spring holding jig 1 for grease application.

When attaching the connector terminal contact spring to the contact spring holding jig 1 for grease application, the operator moves the connector terminal contact spring 60 toward the spring placement portion 10 from above the spring placement portion 10, as illustrated in FIG. 7A.

The operator places the connector terminal contact spring 60 on the spring placement portion 10, while adjusting the position so that the first spring position restricting wall 30 enters the gap 63 of the connecting portion 62, and thus, the connector terminal contact spring 60 is completely attached to the contact spring holding jig 1 for grease application (see FIG. 7B).

The operator can remove the connector terminal contact spring 60 from the contact spring holding jig 1 for grease application, only by raising the connector terminal contact spring 60 upward from the spring placement portion 10.

As illustrated in FIG. 1, the grease application apparatus 100 moves the guide frame portion 120 in the direction of the arrow Z, or moves the movable base portion 130 to slide in the direction of the arrow XY, and furthermore, rotates the contact spring holding jig 1 for grease application in the direction of the arrow R, thereby making it possible to variously change the relative position of the connector terminal contact spring 60 with respect to the grease applying spray S fixed at a predetermined position.

In addition, since the connector spring contact spring 60 is held so that the contact spring holding jig 1 for grease application does not interfere with the spring piece 61 and the target region of grease application around the spring piece 61, it is possible to apply the grease G to the front and back of the spring piece 61 and the target region of grease application around the spring piece 61, while preventing variations.

In this embodiment, an example in which the grease application apparatus 100 fixes the grease applying spray S and moves the movable table 110 on which the connector terminal contact spring 60 is held is illustrated. However, the exemplary embodiment is not limited thereto, and the grease applying spray S may be moved.

The contact spring holding jig 1 for grease application according to the embodiment of the invention places the connector terminal contact spring 60 on the spring placement portion 10 so that the first spring position restricting wall 30 is disposed in the gap 63 of the connecting portion 62 and restricts the position on the spring placement portion 10 without fixing the connector terminal contact spring 60. In addition, since the first spring position restricting wall 30 has a simple structure such as a wall erected on the spring placement portion 10, the contact spring is easily to be attached to and detached from the jig, and it is possible to hold the connector terminal contact spring 60 with a simple structure so as not to interfere with the spring piece 61 and its surrounding target region of grease application.

Further, in the contact spring holding jig 1 for grease application according to the embodiment of the invention, the second spring position restricting wall 40 restricts the position of the connector terminal contact spring 60 on the spring placement portion 10 in the width direction of the spring piece 61 by the inner wall part 41 and the outer wall part 42. Thus, it is possible to further improve the holding performance of the connector terminal contact spring 60 on the spring placement portion 10 (modified example).

Next, a modified example of the contact spring holding jig 1 for grease application according to the embodiment of the invention will be described with reference to FIG. 8.

Figure 8:
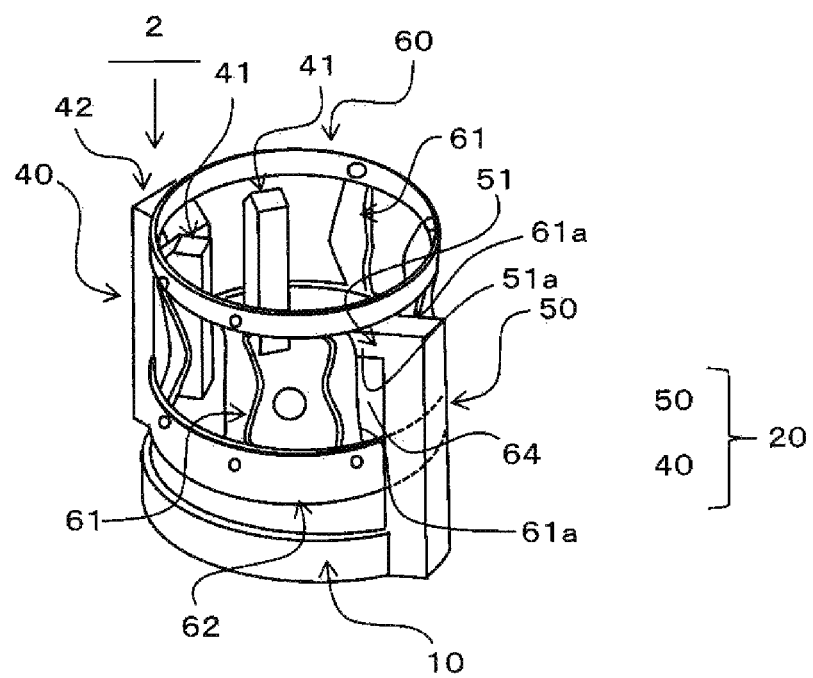
FIG. 8 is a perspective view illustrating a state where the connector terminal contact spring is set in a contact spring holding jig for grease application of a modified example.

FIG. 8 is a perspective view illustrating a state where the connector terminal contact spring 60 is set in a contact spring holding jig 2 for grease application of the modified example.

The contact spring holding jig 2 for grease application of this modified example is different from the contact spring holding jig 1 for grease application in the embodiment in that the first spring position restricting wall 50 is disposed in the gap 64 between the adjacent spring pieces 61.

The rest of the configuration is the same as that of the embodiment, the same reference numerals are given to the same components as those of the embodiment, and the explanation thereof is omitted.

The first spring position restricting wall 50 is erected on the spring placement portion 10 and has a projecting wall portion 51 formed with a pair of spring position restricting surfaces 51a and 51a disposed close to the opposing side surface 61a of the adjacent spring piece 61 forming the gap 64 of the adjacent spring piece 61.

The first spring position restricting wall 50 prevents the connector terminal contact spring 60 from being moved in the direction in which the four spring pieces 61 are arranged so as not to interfere with the spring piece 61 and the target region of grease application around the spring piece 61.

When attaching the connector terminal contact spring to the contact spring holding jig 1 for grease application, the operator moves the connector terminal contact spring 60 from above the spring placement portion 10 toward the spring placement portion 10.

If the position of the projecting wall portion 51 of the first spring position restricting wall 50 is set to be higher than the upper surfaces of the pair of inner side walls 41 and 41 and the outer side wall 42 of the second spring position restricting wall 40, the connecting portion 62 can be disposed between the pair of inner wall parts 41 and 41 and the outer wall part 42 in a state in which the projecting wall portion 51 is disposed in the gap 64 of the adjacent spring piece 61.

The contact spring holding jig 2 for grease application of this modified example places the connector terminal contact spring 60 on the spring placement portion 10 so that the first spring position restricting wall 50 is disposed in the gap 64 between the adjacent spring pieces 61 and restricts the position on the spring placing portion 10 without fixing the connector terminal contact spring 60. In addition, since the first spring position restricting wall 50 has a simple structure of a wall erected on the spring placement portion 10, as in the case of the contact spring holding jig 1 for grease application of the embodiment, attachment and detachment of the contact spring to and from the jig can be easily carried out, and it is possible to hold the connector terminal contact spring 60 with a simple structure so as not to interfere with the spring piece 61 and its surrounding target region of grease application.

Although the contact spring holding jig 1 for grease application according to the embodiment of the invention is exemplified as being incorporated in the grease application apparatus 100, the invention is not limited thereto, and the contact spring holding jig 1 for grease application may be used for grease applying operation using a manual spray.

Further, in the contact spring holding jig 1 for grease application according to the embodiment of the invention, an example in which the second spring position restricting wall 40 has the pair of inner wall parts 41 and 41 and the outer wall part 42 has been described. However, the invention is not limited thereto, and the connecting portion 62 may be sandwiched by at least one inner wall part and outer wall part.

Although the invention made by the present inventor has been specifically described based on the embodiment of the invention as described above, the invention is not limited to the above-described embodiment of the invention, and various modifications can be made within the scope not deviating from the gist thereof.

DESCRIPTION OF REFERENCE NUMERALS AND SIGNS 1, 2 Contact spring holding jig for grease application
10 Spring placement portion
20 Spring position restricting wall
30, 50 First spring position restricting wall (spring position restricting wall)
30a, 51a Spring position restricting surface
51 Projecting wall portion
40 Second spring position restricting wall (spring position restricting wall)
41 Inner wall part
42 Outer wall part
60 Connector terminal contact spring
61 Spring piece
61a Side surface
62 Connecting portion
62a End surface
63, 64 Gap
100 Grease application apparatus
110 Movable table
120 Guide frame portion
130 Movable base portion
131 Jig disposing portion
131a Guide groove portion
C Connector
G Grease
S Grease applying spray

What is claimed is:

1. A contact spring holding jig configured to receive a connector terminal contact spring to facilitate grease application comprising:
   a spring placement portion on which the connector terminal contact spring is to be placed; and
   a spring position restricting wall,
   wherein the connector terminal contact spring includes a plurality of spring pieces and a connecting portion that has two end surfaces, the connecting portion extends along a circumference of a circle such that the connecting portion extends in a circumferential direction from one of the end surfaces to the other of the end surfaces,
   wherein the connecting portion is formed in a circular arc shape,
   wherein a first gap exists between adjacent pieces of the plurality of spring pieces, and the plurality of spring pieces are connected to be arranged side by side by the connecting portion,
   wherein the connector terminal contact spring is placed with the connecting portion facing downward, on the spring placement portion,
   wherein the spring position restricting wall directly extends from the spring placement portion and is disposed in a second gap which is formed between the two end surfaces of the connecting portion in the circumferential direction so as to restrict the position of the connector terminal contact spring in the circumferential direction on the spring placement portion, when the connector terminal contact spring is placed on the spring placement portion,
   wherein the spring placement portion is formed in an arc shape corresponding to the connector terminal contact spring, and
   wherein the spring position restricting wall is erected on the spring placement portion and disposed along an inner side and an outer side of the connecting portion, and includes an inner wall part and an outer wall part restricting a position of the connector terminal contact spring on the spring placement portion, and wherein the inner wall part and the outer wall part are arranged on the spring placement portion so as to sandwich the connecting portion between the inner wall part and the outer wall part.

2. The contact spring holding jig for grease application according to claim 1,
   wherein the spring position restricting wall is erected on the spring placement portion and disposed in the second gap so as to restrict the position of the connector terminal contact spring from being moved in the direction in which the plurality of spring pieces are arranged on the spring placement portion, when the connector terminal contact spring is placed on the spring placement portion.

3. The contact spring jig for grease application according to claim 1, wherein the adjacent pieces are spaced apart from each other by the first gap around a periphery of the connector terminal contact spring.

4. The contact spring holding jig for grease application according to claim 1,
wherein the circumferential direction is a direction in which the plurality of spring pieces are arranged.

\* \* \* \* \*